J. L. ROUTIN.
ANTI-AIRCRAFT FIRE CONTROL APPARATUS.
APPLICATION FILED SEPT. 11, 1917.
1,345,705. Patented July 6, 1920.
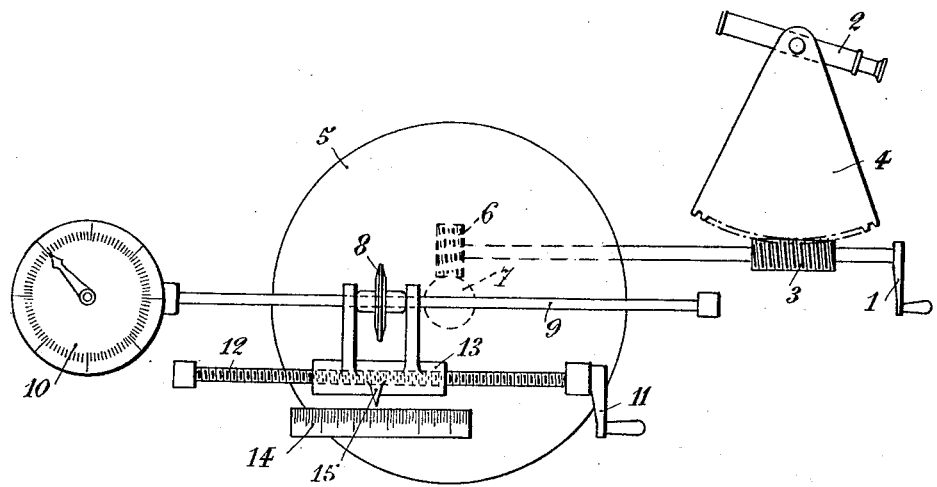
Inventor:
Joseph Louis Routin
By Mauro, Cameron, Lewis & Massie

UNITED STATES PATENT OFFICE.

JOSEPH LOUIS ROUTIN, OF PARIS, FRANCE.

ANTI-AIRCRAFT FIRE-CONTROL APPARATUS.

1,345,705. Specification of Letters Patent. Patented July 6, 1920.

Application filed September 11, 1917. Serial No. 190,812.

*To all whom it may concern:*

Be it known that I, JOSEPH LOUIS ROUTIN, a citizen of the French Republic, and a resident of 2 Rue Olchanski, Paris, France, have invented a new and useful Improvement in Anti-Aircraft Fire-Control Apparatus, which invention is fully set forth in the following specification.

In my application Serial No. 182,311, filed July 23, 1917, now Patent No. 1,345,697, dated July 6, 1920, I have described and claimed chronotelemetrical apparatus for use in regulating the firing of anti-aircraft guns which shows directly and without previous calculations the indications for regulating the time fuse of the projectile and the corrections to be made in the adjustment, both in height and in direction, in order to compensate for the displacement of the target during the flight of the projectile.

The present invention relates to apparatus of the above class and has for its object to provide improved means for visually indicating corrections in zenithal and azimuthal adjustments of the aiming devices.

The improvement consists, in principle, in interposing between the tachometer and the actuating mechanism of the telescope a transmission gear arranged so as to allow the relation $r$ of the speed of the telescope to the speed of the shaft of the tachometer to be modified as required.

The indications read on the tachometer are then proportional to the product of the angular speed of the objective by the value of the relation $r$. It will suffice, therefore, to make $r$ equal to the time of flight in order to be able to directly read the value of the correction.

As transmission means mechanism comprising a disk covered with leather on the surface of which presses a small milled wheel can be used, the axle of the milled wheel being perpendicular to that of the disk and which can be displaced on a radius of the latter in front of a scale graduated in duration of traject.

In order that the invention may be more readily understood, reference is had to the accompanying drawings showing by way of example one constructional form of the invention.

1 designates a hand-wheel for moving in elevation a telescope 2 through a worm gear 3 and sector 4. 5 is a disk covered with leather driven by helicoidal gears 6 and 7 operated by handle 1. Disk 5 drives a friction wheel 8 slidably mounted on shaft 9 arranged perpendicular to the axis of disk 5 and, through shaft 9, operates a tachometer 10. The disk 8 is adjusted along the radius of wheel 5 to vary at will the multiplication sought by means of a yoke-nut 13 mounted on a screw spindle 12 operated by aid of a handle 11. The nut 13 is provided with an index 15 moving in front of a scale 14 graduated in times of flight.

In operation, the telescope 2 is made to follow the zenithal angular displacements of the target by turning handle 1. The pointer 15 is adjusted along the scale 14 by turning handle 11 to a point corresponding to the time of flight $t_2$ as determined at the telechronograph station. The tachometer 10 by selection of proper graduations will then indicate directly the product $t_2 \left(\dfrac{d\alpha}{dt}\right)_o$ when $t_2$ is the predicted time of flight and $\left(\dfrac{d\alpha}{dt}\right)_o$ represents the zenithal speed of the target. By aid of a similar arrangement the azimuthal correction may be obtained.

For the determination of the quantity $t_2$, chronotelemetric apparatus is employed as shown and described in my above application Serial No. 182,311.

What I claim as my invention and desire to secure by Letters Patent of the United States is:—

In apparatus for regulating the firing of anti-aircraft guns, the combination of a sighting telescope, a tachometer and power transmitting means for transmitting the movements of the telescope to said tachometer including adjustable speed-varying means adapted to maintain the speed ratio equal to a predetermined time of flight of the projectile thereby enabling the tachometer to indicate the product of the time of flight by the angular speed of the target for zenithal or azimuthal corrections.

In testimony whereof I have signed this specification.

JOSEPH LOUIS ROUTIN. [L. S.]

Witnesses:
HENRI MONIN,
JOSEPH GEMENI.